United States Patent
Peng

(10) Patent No.: US 7,780,337 B2
(45) Date of Patent: Aug. 24, 2010

(54) BLEND SOUP MAKER

(76) Inventor: Zheng Peng, 4694 Sycamore Dr., Ypsilanti, MI (US) 48197

( * ) Notice: Subject to any disclaimer, the term of this patent is extended or adjusted under 35 U.S.C. 154(b) by 831 days.

(21) Appl. No.: 11/676,492

(22) Filed: Feb. 19, 2007

(65) Prior Publication Data
US 2008/0198688 A1    Aug. 21, 2008

(51) Int. Cl.
*B01F 7/14* (2006.01)
*B01F 15/06* (2006.01)
(52) U.S. Cl. .......................... 366/144; 366/205; 99/348
(58) Field of Classification Search .................. 366/205, 366/144, 145, 147, 146, 199, 204; 99/348
See application file for complete search history.

(56) References Cited

U.S. PATENT DOCUMENTS

| | | | | |
|---|---|---|---|---|
| 2,282,866 A | * | 5/1942 | Hagen | 366/205 |
| 3,176,968 A | * | 4/1965 | Appleton | 366/146 |
| 3,220,450 A | * | 11/1965 | Aronson, II et al. | 241/199.12 |
| 5,048,402 A | * | 9/1991 | Letournel et al. | 99/348 |
| 6,065,861 A | | 5/2000 | Chen | |
| 6,289,793 B1 | * | 9/2001 | Hu et al. | 99/332 |
| 6,318,247 B1 | * | 11/2001 | Di Nunzio et al. | 99/348 |
| 2006/0286255 A1 | | 12/2006 | Xu et al. | |
| 2008/0198688 A1 | * | 8/2008 | Peng | 366/145 |

\* cited by examiner

*Primary Examiner*—Tony G Soohoo

(57) ABSTRACT

A blend soup maker (100). Soup maker (100) comprises a jar (102) having an open top and an open bottom for holding food, a lid (104) for closing the open top of jar (102), a bottom cap (106) for closing the open bottom of jar (102), a blending blade (114) installed inside jar (102) for blending food, an electrical heating tube (116) fixedly installed on the bottom of jar (102) for heating food, a base support (112) disposed underneath jar (102) for supporting jar (102), a blending motor (124) installed inside support base (112) and removably coupled with blade (114) for driving blade (114) to blend food, and a support member (110) engaged with the lower portion of jar (102) for adapting jar (102) to stand on base support (112).

20 Claims, 8 Drawing Sheets

BLEND SOUP MAKER

TECHNICAL FIELD AND INDUSTRIAL APPLICABILITY OF THE INVENTION

This invention generally relates to cooking appliances or equipment. More specifically, this invention relates to blend soup makers.

BACKGROUND OF THE INVENTION

Traditional cookers for making soups have a container for holding food and a handle for use of handling the container. When making soups, people have to stir food to facilitate heat transfer and uniform heating. For smooth and creamy soups, people use a blender to blend food after food has been cooked. This two-step process involves labor and skills and it is inconvenient and, sometimes, potentially unsafe to operate.

U.S. Pat. No. 6,065,861, issued to Chen on May 23, 2000, describes a soup making apparatus, which can perform blending and boiling functions so as to separate dregs from juice or soup to produce an edible soup or juice. The proposed apparatus has two containers. Users can use one container to initially separate juice or soup from undesired solids and then transfer the soup or juice into the other container, a heating container, to boil the same.

U.S. patent application Ser. No. 11/160,319, by Xu, et al., teaches regarding an automatic soup cooking apparatus, which combines cooking and blending into one-step process. The container sits on a heater for heating food disposed inside the container. However, testing has shown that the efficiency of heat transfer from the heater to the container is very low due to limited heating surface. The cooking process for one load of soup extends too long, diminishing applications. In additions, the container is made of a metal material, such that the container for holding food can be heated. Based on market study results, consumers desire a transparent container, similar to those used for blenders, such that they can observe cooking processes.

Therefore, it remains desirable to provide a blend soup maker that has a blending mechanism for hands free soup making, that can be used to combine blending and heating of food into one single appliance or equipment to save time and efforts, that the cooking jar is at least partially made of a transparent material, such that users can observe cooking processes.

BRIEF SUMMARY OF THE INVENTION

Accordingly, the present invention is a blend soup maker. This soup maker comprises a jar having an open top and an open bottom for holding food, a lid for closing the open top of the jar, a bottom cap for closing the open bottom of the jar, a blending blade installed inside the jar for blending food, an electrical heating tube fixedly installed on the bottom of the jar for heating food, a base support disposed underneath the jar for supporting the jar, a blending motor installed inside the base support and removably coupled with the blending blade for driving the blending blade, and a support member for adapting the jar removably stand on the base support. The jar includes an upper portion and a lower portion fixedly and sealingly engaged with each other. The upper portion is made of a non-metal transparent material and the lower portion is made of a metal material of high thermal conductivity.

Accordingly, the followings are some of the objects, features, and advantages of the present invention.

It is an object of the present invention to provide a blend soup maker for making soups.

It is another object of the present invention to provide a blend soup maker that combines heating and blending into one single appliance or equipment for making soups.

It is a feature of the present invention that this blend soup maker has a jar made of at least two different materials, a non-metal transparent material for the upper portion and a metal material of high thermal conductivity for the lower portion. These two portions are fixedly and sealingly engaged with each other to form a whole jar.

It is another feature of the present invention that an electrical heating tube is fixedly installed on the bottom the jar, such that the efficiency of heat transfer is adequately high to save time and energy for cooking.

It is a further more feature of the present invention that this blend soup maker includes a support member for supporting the jar. The upper end of the support member is fixedly engaged with the periphery of the bottom portion of the jar and the lower end of the support member extends downward to a predetermined distance for adapting the jar to stand on a base support or on a horizontal surface.

It is a still further more feature of the present invention that a thermostat is removably engaged with the bottom of the jar for detecting and limiting the temperature and controlling the heating tube.

It is an advantage of the present invention that this blend soup maker is highly efficient in heat transfer to save cooking time and energy.

It is another advantage of the present invention that this blend soup maker allows users to observe cooking processes through a two-toned jar.

Further more features and advantages of the present invention will be readily appreciated, as the same becomes better understood after reading the subsequent description when considered in connection with the non-limiting accompanying drawings.

DETAILED DESCRIPTION OF THE INVENTION

Figure 1:
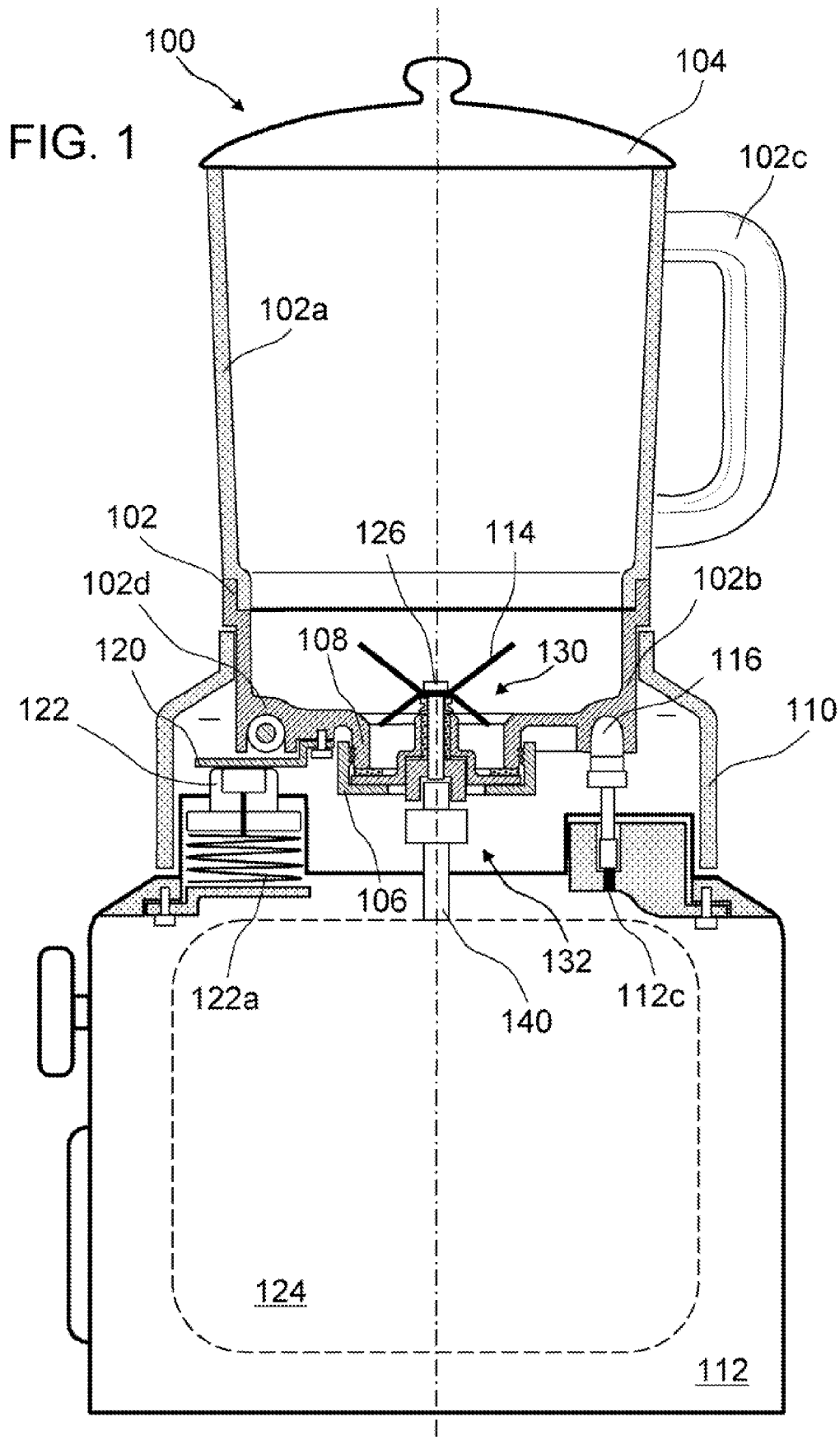
FIG. 1 illustrates a cross-sectional view of an embodiment of the present invention, a blend soup maker 100.

Reference is made to FIG. 1, which illustrates a cross-sectional view of an embodiment of the present invention, a blend soup maker 100.

Jar 102, having an open top and an open bottom, is provided for holding food. Jar 102 is divided into two portions, an upper portion 102*a* and a lower portion 102*b*. Upper portion 102*a* is preferably made of a non-metal transparent material, such that users can see through for cooking process observation. Lower portion 102b is made of a metal material of high thermal conductivity, such that a heater can be installed on the bottom of jar 102 for providing heating power. Upper portion 102a and lower portion 102b are fixedly and sealingly combined together using heat-resistant super glues, or some other manufacturing processes, as known to those skilled in the art. The separation line between these two portions is disposed substantially away from the bottom of jar 102 to avoid potential overheating of the separation line and upper portion 102a. The separation line can have many design variations in pattern based on specific designs. Numerous other potential design variations with respect to the separation line are suggested and covered by this invention disclosure. A grasp handle 102c is fixedly installed on the sidewall of jar 102 for use of handling jar 102.

A lid 104 is provided for closing up the open top of jar 102. Lid 104 engages with the upper portion of jar 102 with a predetermined preloading for preventing drop-off of lid 104 and food splashing during blending. Some venting slots or holes may be provided on lid 104 or the upper edge of jar 102 for venting steam generated during cooking. Lid 104 can also be made of a glass material, such that lid 104 has a predetermined weight for preventing drop-off and food splashing during blending.

A bottom cap 106, removably engaged with a cylindrical inner wall 108, is provided for closing up the open bottom thereof. Wall 108 emanates from the bottom of jar 102 downward to a predetermined distance and forms the open bottom of jar 102.

A support member 110, having a generally tapered hollow cylindrical configuration, is provided for supporting jar 102. The upper end of support member 110 is fixedly engaged with the periphery of the bottom portion of jar 102 and the lower end of support member 110 is extended downward to a predetermined distance, such that jar 102 is adapted to stand on a base support 112 or on a horizontal countertop. Support member 110 is also provided for enclosing the space underneath the bottom of jar 102 into a protected space. Some windows or slots (not shown) may be opened on support member 110 for venting heat, etc.

A blending blade 114, installed inside jar 102, is provided for blending food disposed inside jar 102. Blade 114 rotates at high speeds, e.g., over 8,000 rpm, for blending food. When rotating at lower speeds, e.g., below 2,000 rpm, blade 114 serves as a stirrer for generating food movement within jar 102 to facilitate heat transfer and uniform heating.

An electrical heating tube 116, having a generally circular configuration, is provided for heating food disposed inside jar 102. Heating tube 116 is fixedly installed on the outside surface of the bottom of jar 102, inserted into a groove 102d formed on the bottom of jar 102, and disposed substantially close to the periphery of the bottom of jar 102. The upper portion of groove 102d is preferably disposed at a vertical position above the bottom of jar 102, such that groove 102d protrudes upward into the inner space of jar 102 to save some vertical space below the bottom of jar 102 required for installing heating tube 116. This design feature would also increase the heating surface inside jar 102, such that heat transfer from heating tube 116 to food is enhanced. The two electrical terminals of heating tube 116 extend downward to a predetermined distance and are adapted to removably engage with an electrical power supply, as jar 102 is installed in position on base support 112.

There are significant advantages of installing heating tube 116 directly on the bottom of jar 102. These advantages include saving a significant amount of material for building a full heater that has a thermal diffusion plate, resulting in space and cost saving and higher heat transfer efficiency, etc. A predetermined protrusion of heating tube 116 upward into the inner space of jar 102 would further enhance heat transfer from heating tube 116 into food disposed inside jar 102 and reduce the vertical dimension required for installing heating tube 116 below the bottom of jar 102.

A thermo plate 120, made of a material of high thermal conductivity, is fixedly installed on the bottom of jar 102, at a location substantially close to heating tube 116, for removably engaging with a thermostat 122. Thermostat 122 is installed on base support 112 and is engaged with thermo plate 120 for detecting the temperature of the bottom of jar 102, as jar 102 is installed in position on base support 112. Such temperature is used to control the electrical power to heating tube 116. The upper end of thermostat 122 protrudes upward above the upper surface of base support 112 with pre-loading, e.g., via a spring member 122a. Thermostat 122 can be a digital sensor, such as a NTC or PTC, or an adjustable thermostat, or simply a temperature switch, as known to those skilled in the art.

Base Support 112, disposed underneath jar 102, is provided for supporting jar 102. The upper portion of base support 112 is removably engaged with the inner periphery of the lower portion of support member 110. As jar 102 is installed in position on base support 112, thermostat 122 is engaged with thermo plate 120, or directly with the bottom of jar 102, and the electrical terminals of heating tube 116 are removably connected with an electrical port 112c disposed on base support 112.

A blend motor 124 is installed inside base support 112 for providing rotation power to blending blade 114. Motor 124 is removablely coupled with a drive shaft 126, as jar 102 is installed in position on base support 112. The upper end of drive shaft 126 is engaged with blade 114 and the lower end of shaft 126 is coupled with motor 124 through a coupling device 132.

Figure 2:
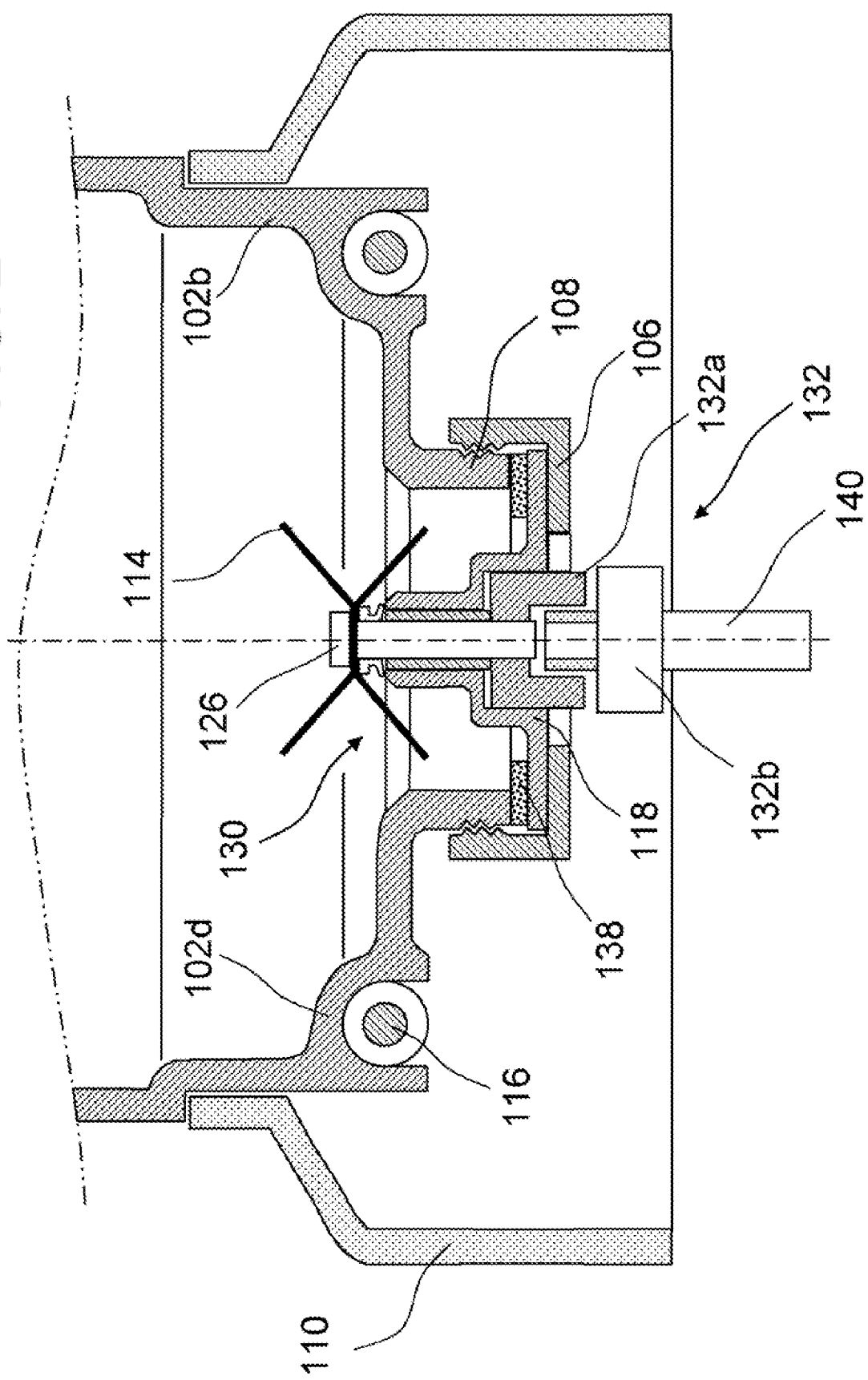
FIG. 2 illustrates an exploded cross-sectional view of blending blade 114 and the neighboring components in FIG. 1.

As more clearly illustrated in FIG. 2, which illustrates an exploded cross-sectional view of blade 114 and its neighboring components in FIG. 1, blade 114 is removably installed on the bottom of jar 102 through a holding brace 118. The bottom of brace 118 has a circular flat configuration and fits into the bottom of cap 106. When cap 106 is tightened onto the bottom of jar 102 through screws thereof, brace 118 is held in position in between the horizontal bottom surface of inner wall 108 and the bottom of cap 106. A seal member 138 is disposed in between brace 118 and the lower end of wall 108 for sealing off the interface thereof. A seal device 130 is provided to create a seal to seal off the interface between shaft 126 and brace 118. A coupling element 132a, fixedly engaged with the lower end of shaft 126, removably receives a motor shaft 140 through a lower coupling element 132b. An insulation member 132c is provided in between coupling elements 132a and 132b, such that heat transferred from drive shaft 126 is prevented from passing through to motor 124, and whereby motor 124 is not overheated with the heat transferred from the bottom of jar 102, as more clearly shown in FIG. 3.

Figure 3:
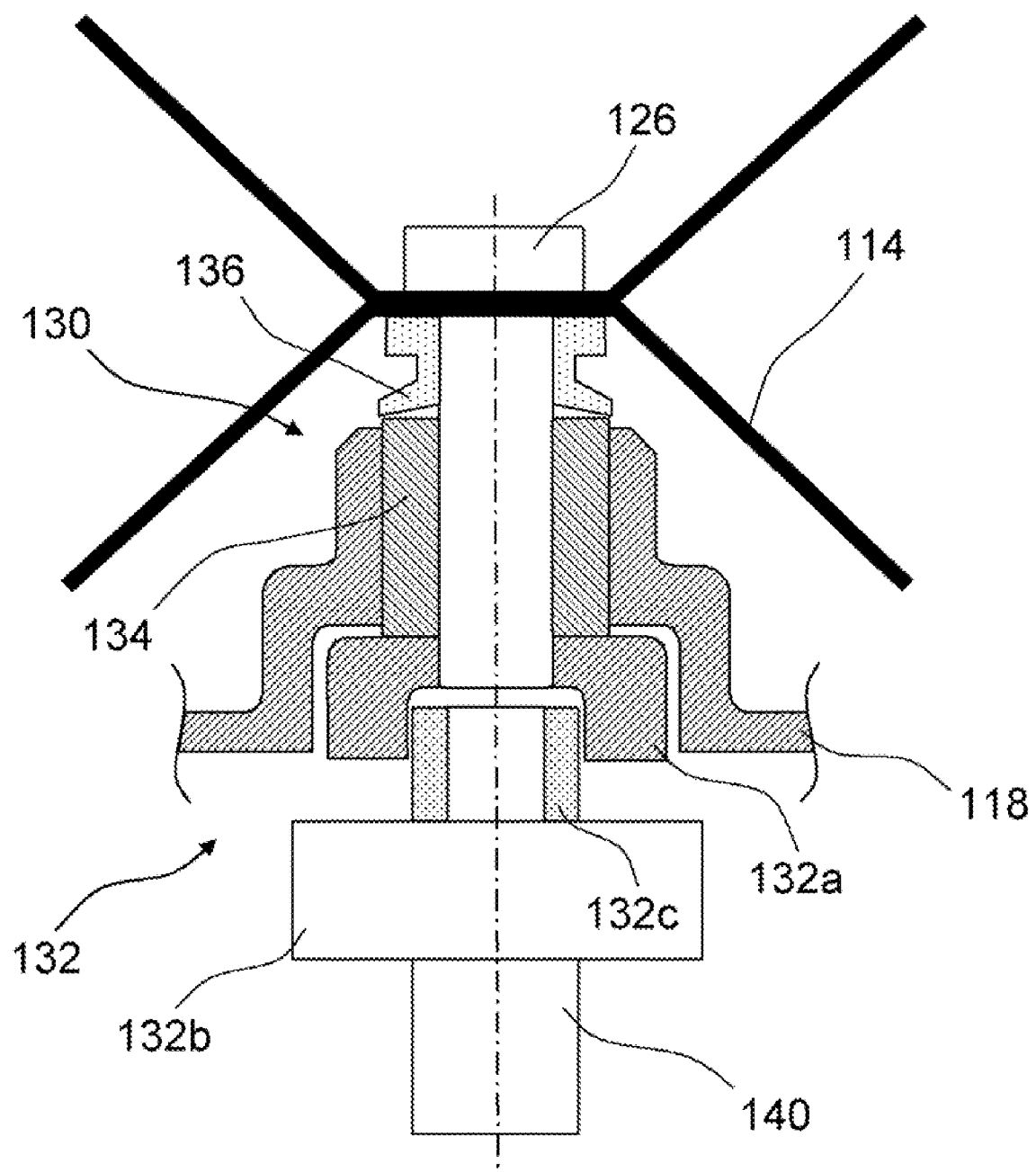
FIG. 3 illustrates an exploded cross-section view of drive shaft 126 and the neighboring components in FIG. 1.

FIG. 3 illustrates an exploded cross-section view of drive shaft 126 and its neighboring components. Seal device 130 includes a bushing member 134 and a seal ring 136. Bushing member 134, fixedly and sealingly engaged with the emanating central portion of brace 118, is provided for holding shaft 126 in position. Shaft 126 is threaded through bushing member 134. Seal ring 136 is installed on shaft 126 in between blade 114 and bushing member 134 for enhanced sealing performance. The tolerance between bushing 134 and shaft 126 is minimized for ideal sealing performance, but, at the same time, shaft 126 should be able to rotate with minimal friction resistance, which requires high precision and high surface smoothness of the fitting surfaces thereof.

Materials for seal ring 136 are extremely important when selecting the proper ring for an application. Basic requirements include heat resistance, wearing resistance, elasticity, etc.

Seal device 130 can, alternatively, take many other forms, such as bushing, seal rings, labyrinth seals, or combinations of multiple forms for ideal performance, as known to those skilled in the art and suggested by this invention disclosure.

Figure 4:
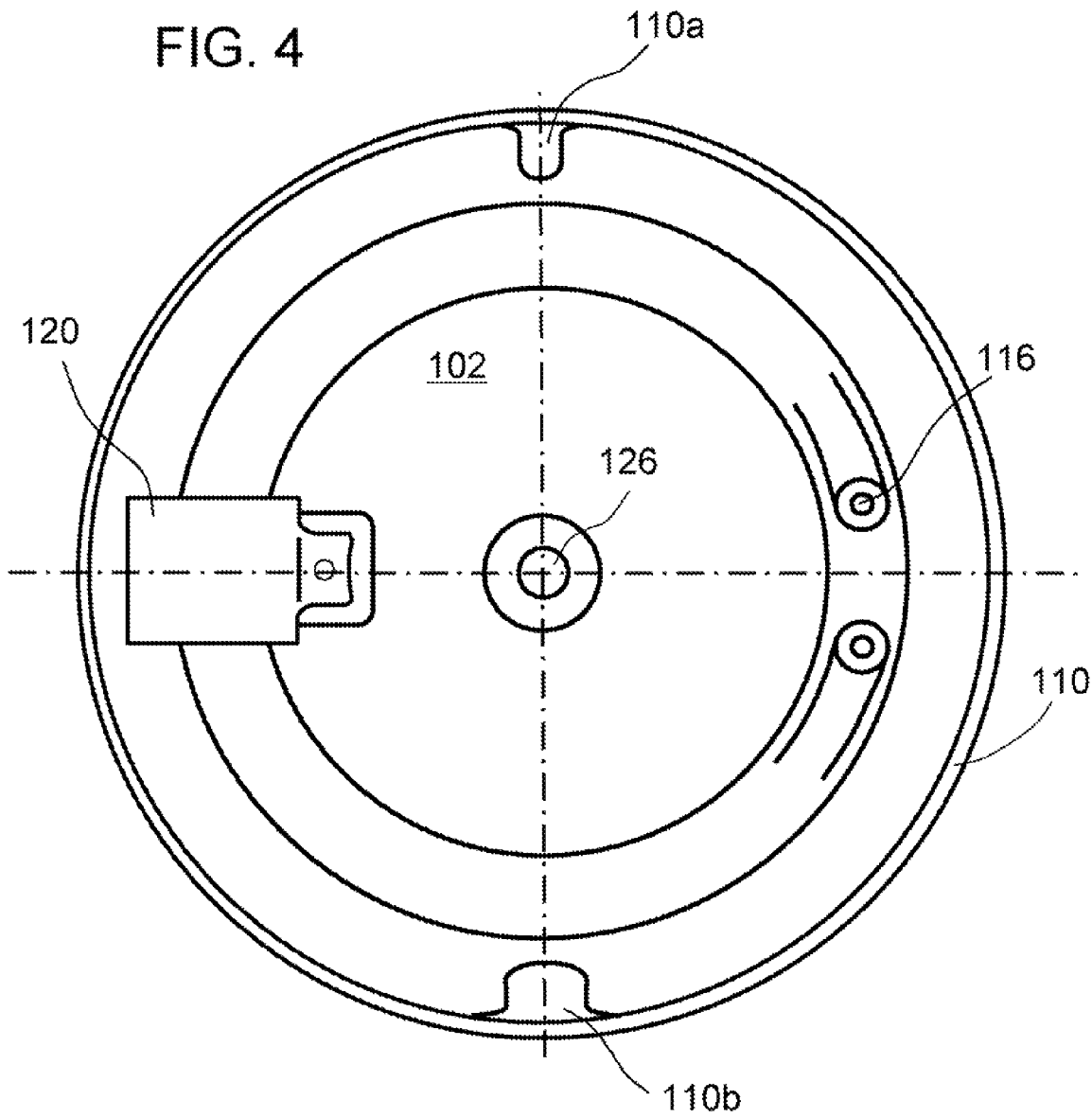
FIG. 4 illustrates a bottom view of jar 102.

FIG. 4 illustrates a bottom view of jar 102 to depict the general layout of various components disposed on the bottom of jar 102. Two position guides, generally designated as 110a and 110b, protrude inward a predetermined distance from the inner surface of support member 110 for guiding jar 102 in position on base support 112.

Figure 5:
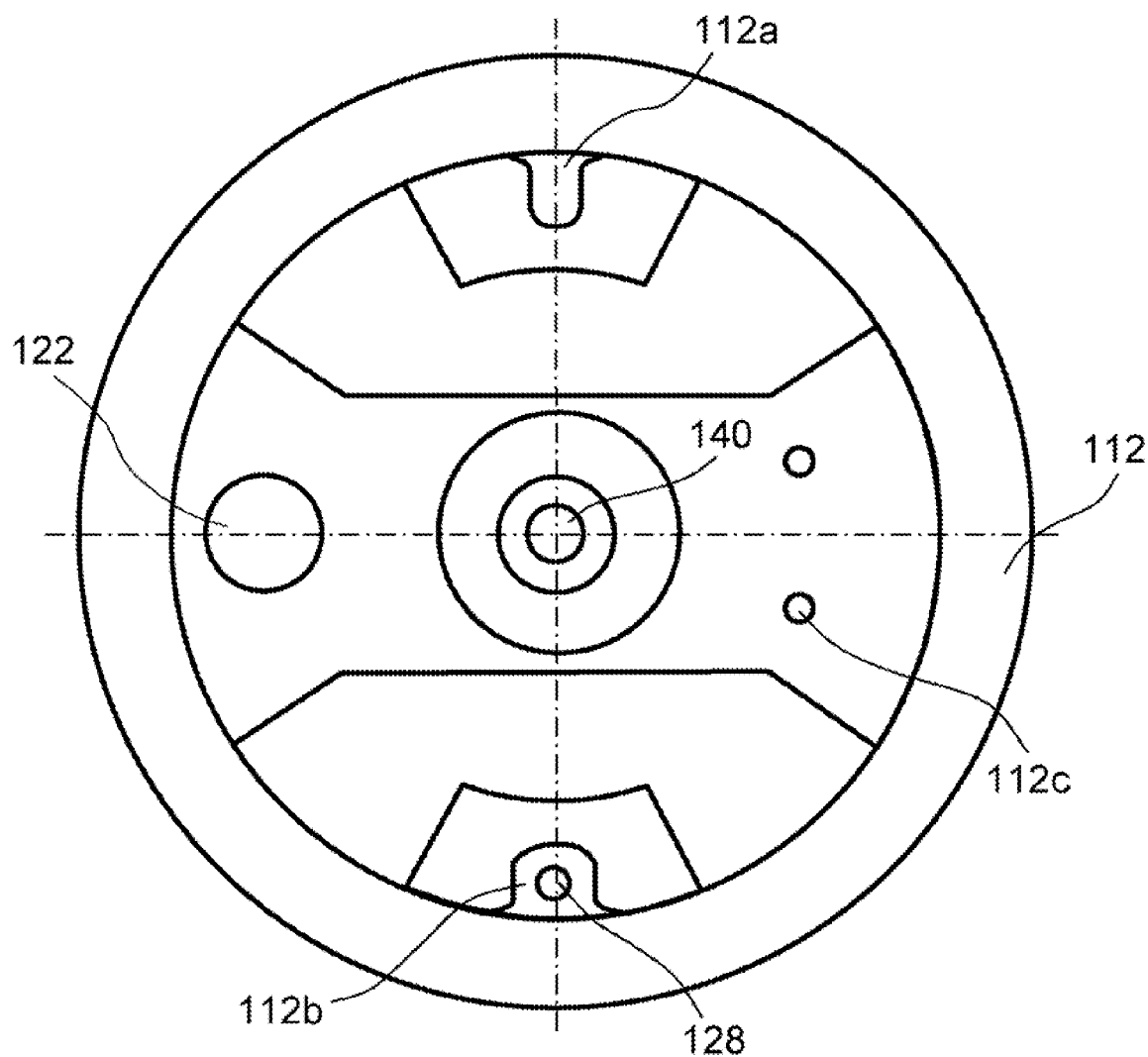
FIG. 5 illustrates a top view of base support 112.

FIG. 5 illustrates a top view of base support 112 to depict the general layout of various components disposed on the top of base support 112. Two base guides, generally designated as 112a and 112b, are provided for removably receiving position guides 110a and 110b, respectively. Electrical port 112c is provided on top of base support 112 for removably receiving the electrical terminals from heating tube 116, such that electrical power from base support 112 is provided to heating tube 116, as jar 102 is installed in position on base support 112. An in-position detector 128 is installed on base support 112 for detecting whether jar 102 is properly installed or not. Detector 128 is disposed at the bottom of base guide 112b. The upper end of detector 128 protrudes a predetermined distance above the bottom of guide 112b, such that when jar 102 is installed in position on base support 112, the lower end of position guide 110b would press with a force on detector 128 to confirm that jar 102 is well positioned.

Figure 6:
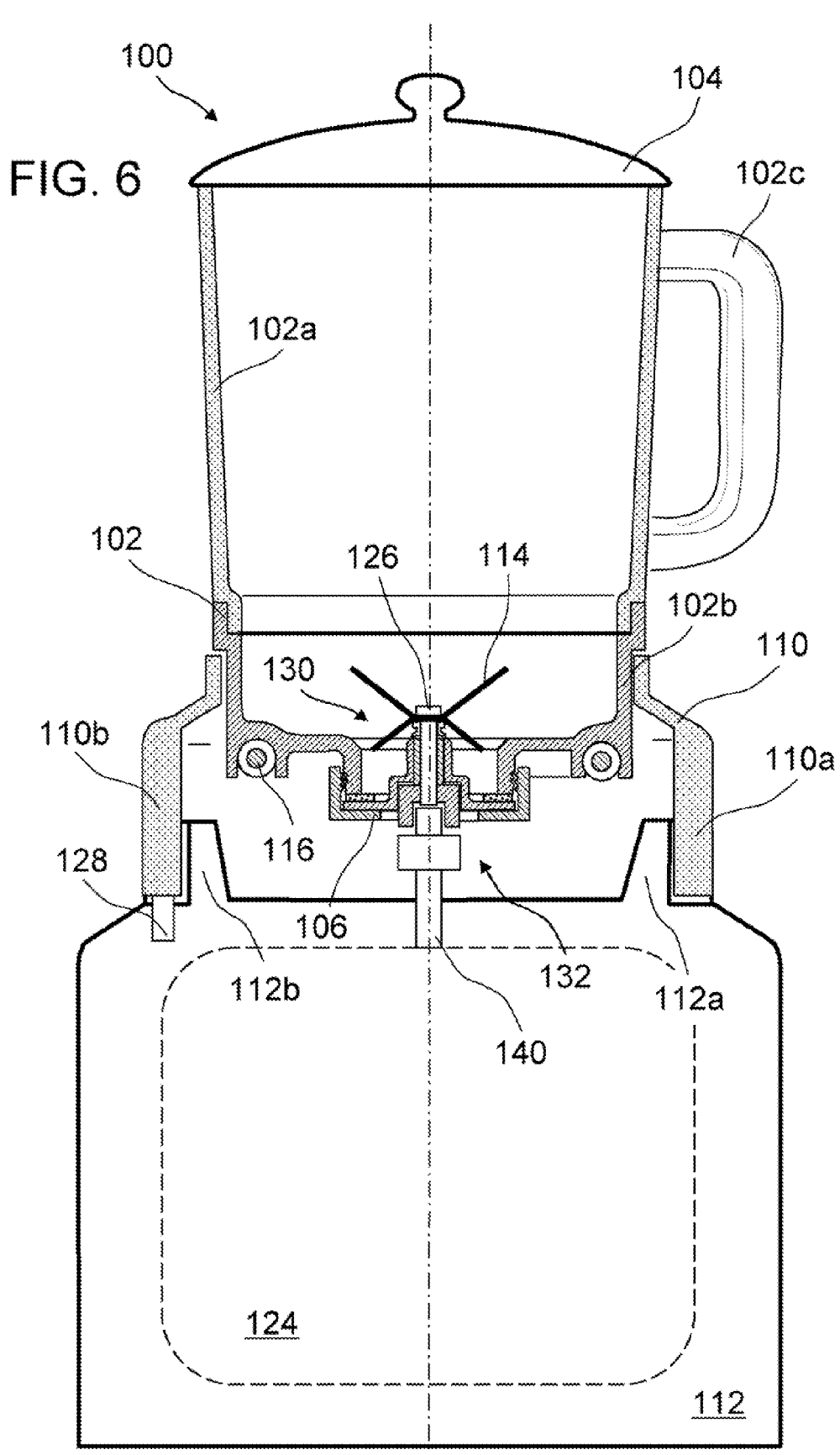
FIG. 6 illustrates another cross-sectional view of blend soup maker 100.

FIG. 6 illustrates another cross-sectional view of blend soup maker 100 to better describe how jar 102 is installed on base support 112. Position guides 110a and 110b are inserted into base guides 112a and 112b, respectively, such that jar 102 is removably locked in position on base support 112.

Accordingly, as jar 102 is properly installed in position on base support 112, thermostat 122 is engaged with thermo plate 120, or directly with the bottom of jar 102, the electrical terminals of heating tube 116 are connected with electrical port 112c, motor 124 is coupled with shaft 126, and detector 128 is depressed to confirm that jar 102 is well in position. Blend soup maker 100 is, now, ready for cooking.

Figure 7:
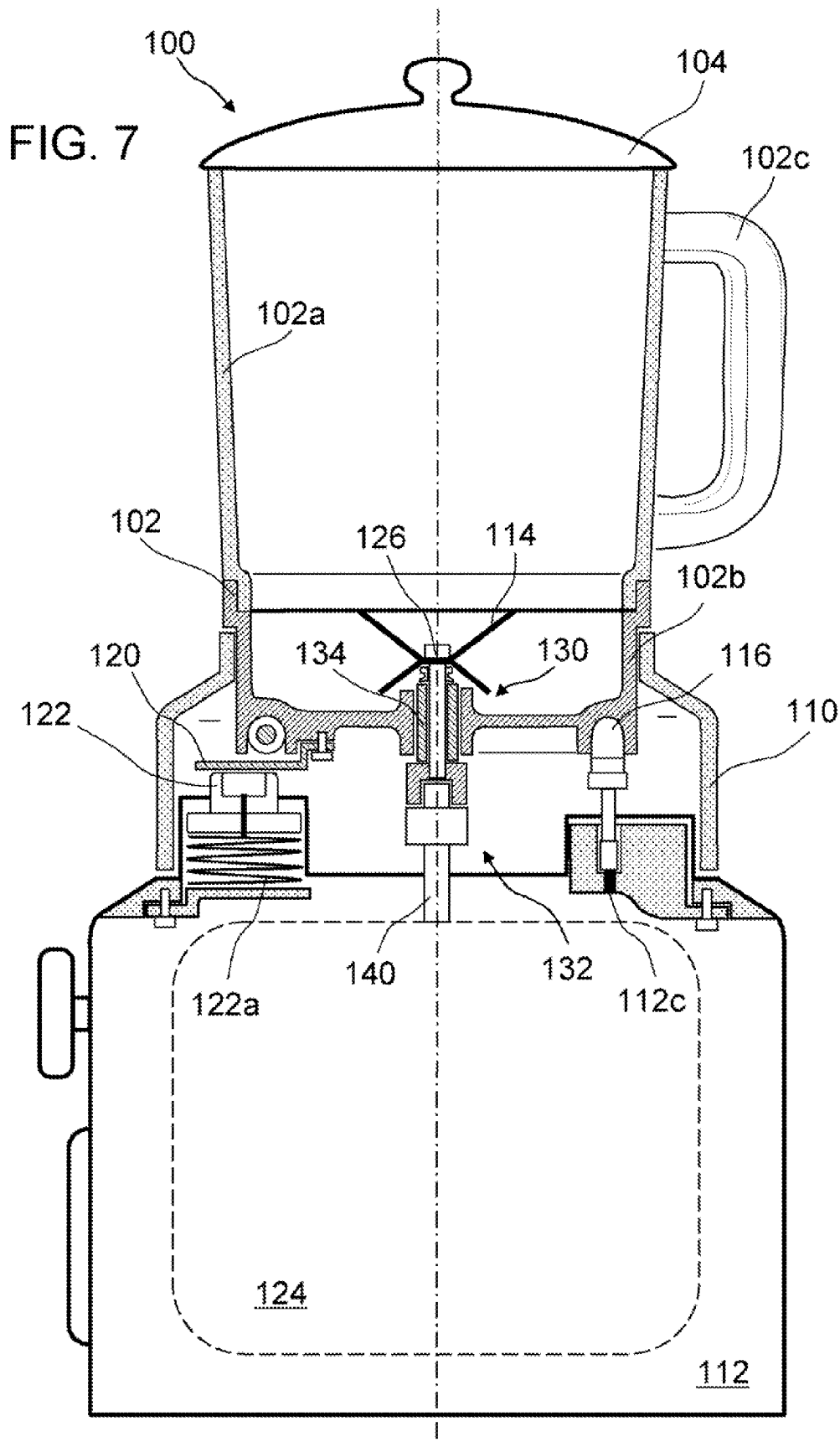
FIG. 7 illustrates a cross-sectional view of an alternative design of blend soup maker 100.
Figure 8:
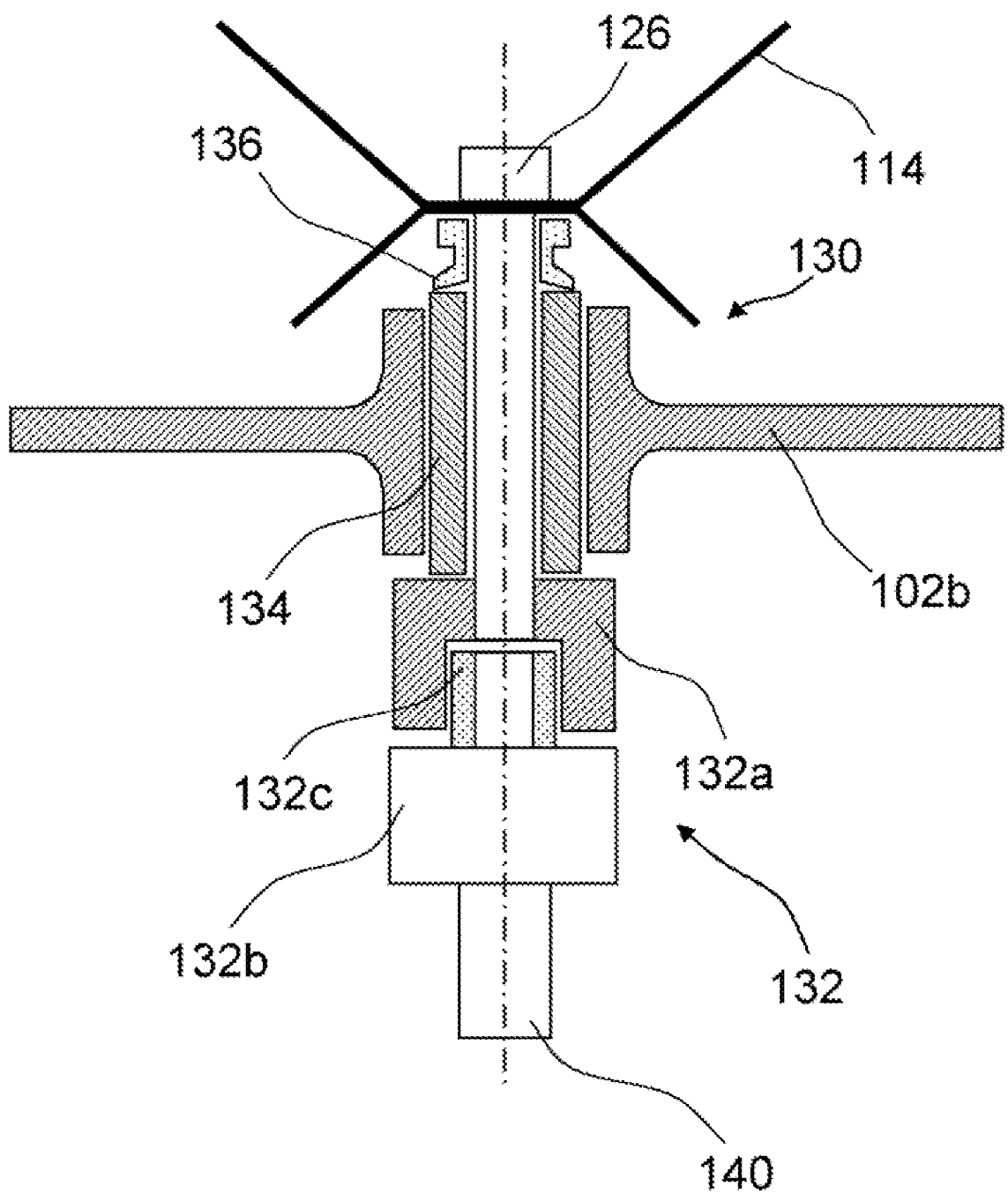
FIG. 8 illustrates an exploded cross-sectional view of drive shaft 126 and the neighboring components of blend soup maker 100 in FIG. 7.

FIG. 7 illustrates an alternative design of blend soup maker 100. In this design, jar 102 has a central aperture on the bottom. Busing member 134 is fixedly and sealingly engaged with the central aperture on the bottom of jar 102. Shaft 126 is threaded through bushing member 134, as more clearly shown in FIG. 8, which illustrates an exploded cross-sectional view of drive shaft 126 and the neighboring components in FIG. 7. In this alternative design, blade 114 is not easily removable. Other features are as the same as what has been previously illustrated for blend soup maker 100 in FIG. 1.

Accordingly, readers will see that this blend soup maker can be used to cook and blend food to make creamy soups. An integrally attached electrical heating tube is highly efficient in heating food, thereby saving time and energy to consumers. The two-toned jar design allows users to observe cooking processes. A support member engaged with the bottom portion of the jar for adapting the jar to stand in position on a base support.

The present invention has been described in an illustrative manner. It is to be understood that the terminology, which has been used, is intended to be in the nature of words of description rather than of limitation.

Although this invention has been described in its preferred forms and structures with a certain degree of particularity, these should not be construed as limiting the scope of the invention but as merely providing illustrations of some of the presently preferred embodiments of this invention.

Thus it is understood that the present disclosure of the preferred forms can be changed in the details of construction and in the combination and arrangement of parts without departing from the spirit and the scope of the invention as hereinafter claimed.

What is claimed is:

1. A blend soup maker, said blend soup maker comprising:
    a jar having an open top and a central aperture on the bottom of said jar for holding food;
    a lid for closing up the open top of said jar;
    blade means installed inside said jar for blending food;
    heating means for heating food disposed inside said jar;
    wherein said heating means is installed on the bottom of said jar;
    a base support disposed underneath said jar for supporting said jar;
    a motor installed inside said base support for driving said blade means;
    wherein said motor is removably coupled with a drive shaft, said drive shaft is threaded through the central aperture on the bottom of said jar, and said drive shaft is engaged with said blade means;
    a thermostat installed on or inside said base support for detecting and limiting the temperature of said heating means;
    wherein said thermostat is preloaded with a spring member, the upper end of said thermostat protrudes generally upward, and when said jar is disposed in position on said base support said thermostat is adapted to be operationally engaged with the bottom of said jar;
    a support member having two ends for supporting said jar;
    wherein the upper end of said support member is engaged with the periphery of the lower portion of said jar and the lower end of said support member extends downward to a predetermined distance, such that said jar is adapted to stand on said base support;
    wherein said motor is engaged with said blade means as said jar is disposed in position on said base support;
    wherein said heating means is connected with an electrical port on said base support as said jar is disposed in position on said base support; and
    wherein said jar together with said support member is removable from said base support.

2. A blend soup maker as defined in claim 1, wherein said jar includes an upper portion and a lower portion, said upper portion is made of a non-metal transparent material and said lower portion is made of a metal material of high thermal conductivity, said upper portion and said lower portion are sealingly engaged with each other.

3. A blend soup maker as defined in claim 1, wherein said heating means includes a heating tube of a circular configuration, said heating tube is fixedly installed on the bottom of said jar, and said heating tube is disposed substantially close to the periphery of the bottom of said jar.

4. A blend soup maker as defined in claim 1, wherein a thermo plate is fixedly installed on the bottom of said jar at a location substantially close to said heating means and when said jar is disposed in position on said base support said thermostat is adapted to be engaged with said thermo plate.

5. A blend soup maker as defined in claim 1, wherein said jar includes a sealing device for sealing off the interface between said drive shaft and the bottom of said jar, said sealing device includes a bushing member and a sealing ring for supporting and sealing said drive shaft, said bushing member is fixedly and sealingly engaged with the central aperture of the bottom of said jar, said drive shaft is threaded through said bushing member, said sealing ring is adapted to be squeezed against said drive shaft and said bushing member, the upper end of said drive shaft is engaged with said blade means and the lower end of said drive shaft is engaged with a coupling element for removably engaging said motor.

6. A blend soup maker as defined in claim 1, wherein said support member includes at least one position guide for guiding said jar in position on said base support, said base support includes at least one base guide for removably receiving said at least one position guide from said support member, such that said jar is guided in position on said base support.

7. A blend soup maker as defined in claim 1, wherein said support member has a generally tapered hollow cylindrical configuration, the upper end of said support member is routed over the lower portion of said jar and is fixedly engaged thereof, the lower end of said support member is routed over the upper portion of said base support and is removably engaged thereof, the upper portion of said base support removably receives the lower end of said support member.

8. A blend soup maker, said blend soup maker comprising:
a jar having an open top and an open bottom for holding food;
a lid for closing up the open top of said jar;
a bottom cap removably installed on the bottom of said jar for closing up the open bottom of said jar;
blade means installed inside said jar for blending food;
heating means for heating food disposed inside said jar;
wherein said heating means is installed on the bottom of said jar;
a base support disposed underneath said jar for supporting said jar;
a motor installed inside said base support for driving said blade means;
wherein said motor is removably coupled with a drive shaft and said drive shaft is engaged with said blade means;
a thermostat installed on or inside said base support for detecting and limiting the temperature of said heating means;
wherein said thermostat is preloaded with a spring member, the upper end of said thermostat protrudes generally upward, and when said jar is disposed in position on said base support said thermostat is adapted to be operationally engaged with the bottom of said jar;
a support member having two ends for supporting said jar;
wherein the upper end of said support member is engaged with the periphery of the lower portion of said jar and the lower end of said support member extends downward to a predetermined distance, such that said jar is adapted to stand on said base support;
wherein said motor is engaged with said blade means as said jar is disposed in position on said base support;
wherein said heating means is connected with an electrical port on said base support as said jar is disposed in position on said base support; and
wherein said jar together with said support member is removable from said base support.

9. A blend soup maker as defined in claim 8, wherein said blade means is held in position by said bottom cap when said bottom cap is tightened onto the bottom of said jar, a sealing material is installed in between the open bottom of said jar and said bottom cap for sealing the interface thereof, and whereby said blade means is removable for ease of cleaning after use.

10. A blend soup maker as defined in claim 8, wherein said jar includes a sealing device for sealing off the interface between said drive shaft and the bottom of said jar, said sealing device includes a bushing member and a sealing ring for supporting and sealing said drive shaft, said bushing member is fixedly and sealingly engaged with a holding brace, said drive shaft is threaded through said bushing member, said sealing ring is adapted to be squeezed against said drive shaft and said bushing member, the upper end of said drive shaft is engaged with said blade means and the lower end of said drive shaft is engaged with a coupling element for removably engaging said motor, said holding brace is disposed in position as said bottom cap is tightened onto the open bottom of said jar, a sealing material is installed in between the open bottom of said jar and said holding brace for sealing off the interface thereof.

11. A blend soup maker as defined in claim 8, wherein said jar includes an upper portion and a lower portion, said upper portion is made of a non-metal transparent material, said lower portion is made of a metal material of high thermal conductivity, said upper portion and said lower portion are sealingly engaged with each other, and whereby users can see through said upper portion and observe cooking processes.

12. A blend soup maker as defined in claim 8, wherein said heating means includes a heating tube of a circular configuration, said heating tube is fixedly installed on the bottom of said jar, and said heating tube is disposed substantially close to the periphery of the bottom of said jar.

13. A blend soup maker as defined in claim 12, wherein said heating tube is disposed at a vertical position, such that the upper side of said heating tube protrudes upward into the inner space above the inner side of the bottom of said jar and the space below the bottom of said jar required for installing said heating tube is reduced.

14. A blend soup maker as defined in claim 8, wherein a thermo plate is fixedly installed on the bottom of said jar at a location substantially close to said heating means and when said jar is disposed in position on said base support said thermostat is adapted to be engaged with said thermo plate.

15. A blend soup maker as defined in claim 8, wherein said support member includes at least one position guide for guiding said jar in position on said base support, said base support includes at least one base guide for removably receiving said at least one position guide from said support member, such that said jar is guided in position on said base support.

16. A blend soup maker as defined in claim 8, wherein said support member has a generally tapered hollow cylindrical configuration, the upper end of said support member is routed over the lower portion of said jar and is fixedly engaged thereof, the lower end of said support member is routed over the upper portion of said base support and is removably engaged thereof, and the upper portion of said base support removably receives the lower end of said support member.

17. A heated blender, said heated blender comprising:
a jar having an open top for holding food;
a lid for closing up the open top of said jar;
blade means installed inside said jar for blending food;
heating means for heating food;
wherein said heating means is installed on the bottom of said jar;
a base disposed underneath said jar for supporting said jar;

a motor installed inside said base for driving said blade means;

wherein said motor is removably coupled with a drive shaft and said drive shaft is engaged with said blade means;

a thermostat installed on or inside said base for detecting and limiting the temperature of said heating means; and wherein said thermostat is preloaded with a spring member, the upper end of said thermostat protrudes generally upward, and when said jar is disposed in position on said base said thermostat is adapted to be operationally engaged with the bottom of said jar.

18. A heated blender as defined in claim 17, wherein said jar includes an upper portion and a lower portion, said upper portion is made of a non-metal material and said lower portion is made of a metal material, and said upper portion and said lower portion are sealingly engaged with each other.

19. A heated blender as defined in claim 17, wherein said heated blender further includes an in-position detector installed on or inside said base for detecting whether said jar is properly disposed in position on said base or not.

20. A heated blender as defined in claim 17, wherein said heated blender further includes a support member for supporting said jar, said support member has a generally hollow cylindrical configuration, the upper end of said support member is routed over the lower portion of said jar, the lower end of said support member is routed over the upper portion of said base and the upper portion of said base removably receives the lower end of said support member.

\* \* \* \* \*